Patented Feb. 14, 1939

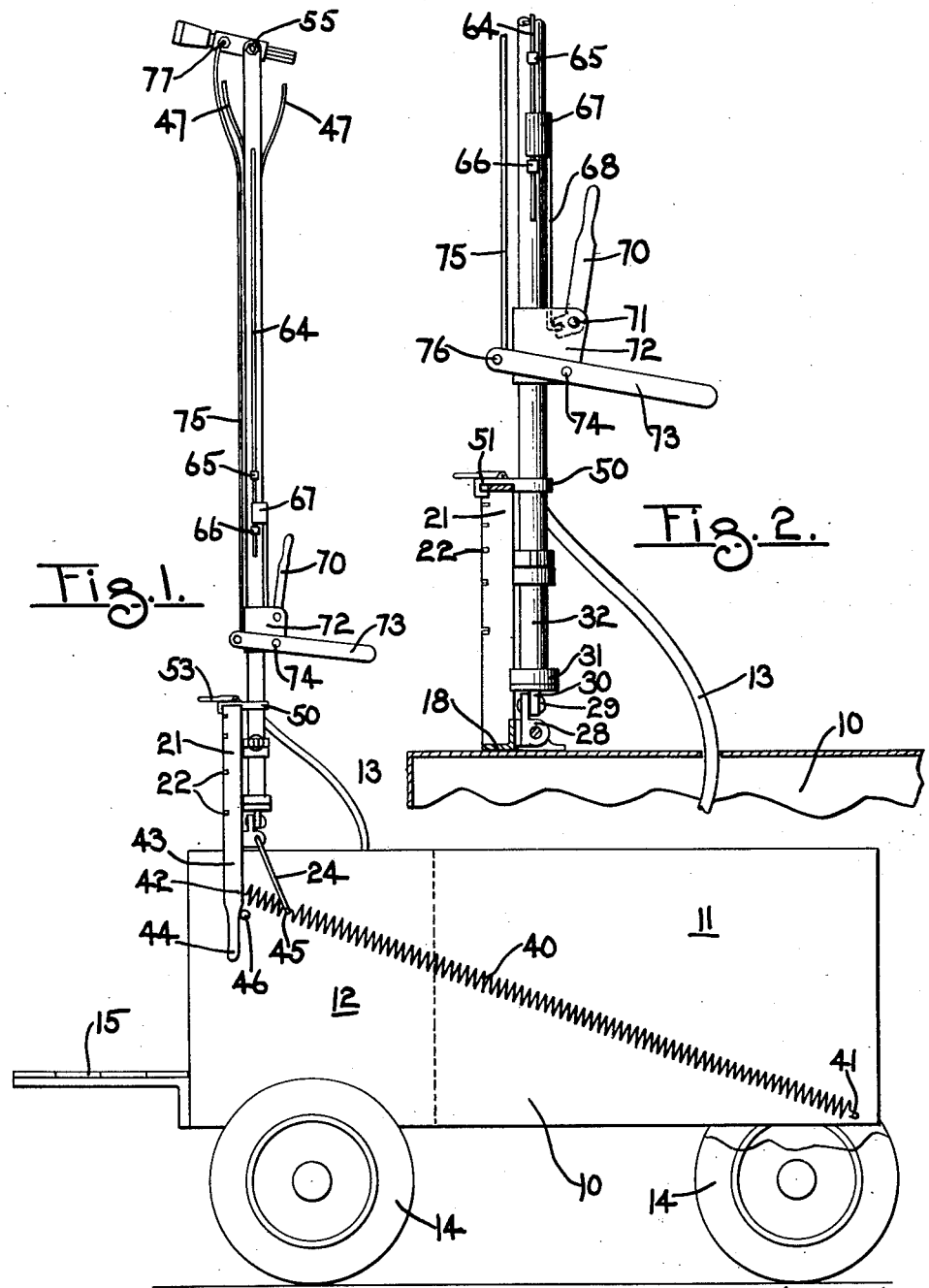

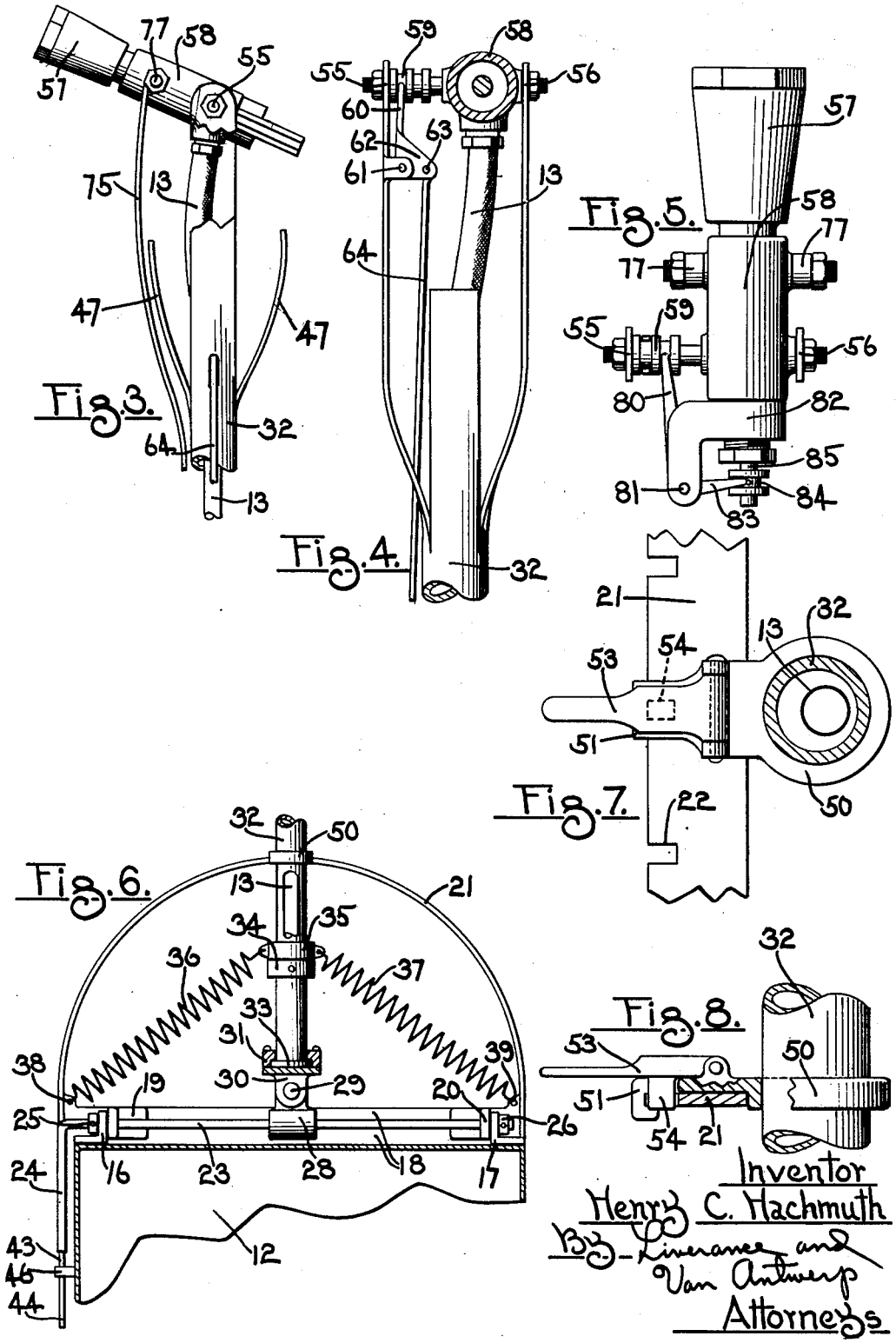

2,147,292

UNITED STATES PATENT OFFICE 2,147,292

SPRAYING DEVICE

Henry C. Hachmuth, Comstock Park, Mich.

Application March 15, 1937, Serial No. 130,979

5 Claims. (Cl. 299—39)

This invention relates generally to an adjustable support and more particularly to a swinging pole having a spraying nozzle adjustably mounted thereupon. Also, means are provided for adjustably controlling the position of the spraying pole and means are also provided for regulating the nozzle from a point near the base of the pole.

My invention resides in my novel assemblage of elements to accomplish efficient spraying by both quickly and properly positioning the nozzle in its most optimum position. Furthermore, the spraying means may be quickly swung to a lower position to permit ready transportation thereof under the branches of the orchard trees and the like.

Other advantages and features will become apparent as the description proceeds.

In the drawings:

Fig. 1 is a side view of my invention applied to a portable construction. This view shows the spraying pole or column in a vertical raised position.

Fig. 2 is an enlarged fragmentary view disclosing the adjustable mounting of the mast and its associated mechanism.

Fig. 3 is a side view of the nozzle construction, this being located at the top of the spraying pole.

Fig. 4 is a fragmentary view, taken at right angles to Fig. 3, the nozzle being shown in section.

Fig. 5 is a plan view of the nozzle and its valve operating mechanism.

Fig. 6 is a view of the base of the pole, together with its mounting, this view being taken at right angles to Figs. 1 and 2, and disclosing spring equalizing means for tending to maintain the pole in its vertical position.

Fig. 7 is a plan view of the locking mechanism for the spraying mast or pole.

Fig. 8 is a view at right angles of Fig. 7, parts being broken away in order to expedite the showing.

Similar numerals refer to similar parts throughout the several views.

Referring to Fig. 1, numeral 10 indicates a vehicle, having a liquid-tight compartment 11, for containing the insecticide or the like, and a second compartment 12 for receiving the pump mechanism. This pump mechanism is not shown but it is for the purpose of drawing the insecticide from the compartment 11 into hose 13 and forcing it to the top of the spraying pole where the insecticide is sprayed from the nozzle.

The vehicle 10 is provided with wheels 14 and has a platform 15, on which the operator may stand, attached to one end thereof. See Fig. 1 of the drawings.

As is clearly shown in Fig. 6, two spaced apart bracket members 16 and 17 are fastened to the vehicle 10 above the compartment 12, this compartment housing the prime mover for the liquid.

An angle member 18, see Figs. 2 and 6, carries bracket members 19 and 20, the faces of these angle brackets being located in opposed relationship to the faces of the brackets, 16 and 17. The brackets 19 and 20 rigidly support a semi-circular frame construction 21, notched as indicated at 22.

A pivot rod 23, having a right angled portion 24 at one end thereof, extends through the bracket members 16, 19, 20 and 17, and collars 25 and 26, attached as clearly shown in Fig. 6 of the drawings, prevent shifting movement of this pivot rod 23.

A journal member 28 is rotatably mounted upon the pivot rod 23. This journal member 28 carries a pivot 29 which receives a base member 30, equipped with a cap 31 whereby the spraying pole 32, having a terminal boss 33, is revolubly mounted upon the universal joint construction provided by the pivot rod 23, the journal 28 and the pivot 29. A collar 34 is fixed to the spraying pole 32 and a sliding and rotatable collar 35 is located immediately thereabove. Springs 36 and 37 are respectively fastened at 38 and 39 onto the semi-circular frame member 21. These springs 36 and 37 tend to medially locate the spraying pole therebetween. The pivot 29 is located concentrically with respect to the frame member 21.

The depending portion 24, of the rod 23, is located as shown in Fig. 1, of the drawings. A relatively long spring 40 is attached at 41 onto one corner of the vehicle and its other end is attached at 42 on the lever member 43, this lever member 43 being a prolongation of the semi-circular portion 21, previously referred to. The lever 43 terminates in a handle portion 44 whereby the semi-circular frame 21 may be swung about the rod 23. A stop 46, see Figs. 1 and 6, limits the upward swinging movement of the spray pole or tower.

The depending portion 24 is fastened at 45 onto the spring 40 and under normal conditions, as shown in Fig. 1, the spring 40 is located in a straight line. Upon operation of the member 21, by means of the handle 44, about the rod 23, the depending portion 24 substantially moves in conjunction with the member 43 and thus the spring 40 is elongated somewhat beyond its normal proportional elongation inasmuch as the path of the spring is extended both axially and in an angular position due to the downward swinging of the lower end of the extension 24. This increases the pulling effect of the spring more than proportionally when the spraying pole and its appurtenances are swung to their lower arc of movement.

The spraying pole 32 extends immediately adjacent the semi-circular member 21 and a collar 50, having a hooked extension 51, is located around the spraying pole 32, the hooked portion 51 extending around and underneath the member 21. See Fig. 8. A pivoted locking lever 53, see Figs. 7 and 8, has a locking tooth or lug 54 which may be swung downwardly into the chosen slot 22. Thus it will be apparent that the spraying pole 32 may be swung in an arc about the pivot 29, see Fig. 6, and then locked in position by means of the locking lug 54 entering the desired one of the notches 22. The springs 36 and 37, as previously mentioned, tend to return the spraying pole 32 to its vertical spraying position whenever the locking means is released.

As shown in Fig. 6, the hose 13, carrying the insecticide, enters inside of the pole 32 and passes upwardly therethrough.

The top of the pole 32 is slit as shown in Figs. 1, 3 and 4. Two of the prongs formed, indicated by numerals 47, serve to protect and shield the hose 13 from branches. Two other prongs are bent outwardly as shown in Figs. 3 and 4, and provide pivotal supports 55 and 56, whereby the nozzle 57 and its associated valve member 58, may be mounted for tilting movement as clearly shown in Figs. 1 and 3.

A double spool member 59, see Figs. 4 and 5, is slidably mounted inside of one of the upwardly extending prongs of the pole 32 and one of the grooves in this double spool receives the bifurcated end 60 of a bell crank lever pivotally mounted at 61. See Fig. 4. The other arm 62 receives a pivotal attachment 63 of the downwardly extending control rod 64. This rod 64, see Figs. 1 and 2, is slidably mounted at 65 and 66 and is rigidly attached at 67 onto the rod 68 which in turn is operated by the lever 70 pivoted at 71 in a bracket 72. This bracket 72 is rigidly attached to the spray pole.

The bracket 72 also receives a second lever 73, pivoted at 74 thereon and a control rod 75, pivoted at 76, extends upwardly to a pivotal attachment 77 onto the nozzle member 57. As will be clearly seen from an inspection of Fig. 1, operation of the lever 73 will rotate the nozzle to the desired vertical angle about the horizontal pivot 55, 56.

The other groove in the double grooved spool receives one arm 80 of a second bell crank, pivoted at 81 on the member 82, rigidly attached to the valve member 58, and the other arm 83 of the bell crank is received in a collar 84. Movement of the collar 84 operates the control rod 85 of the valve. Thus it will be seen that movement of the rod 64, this being caused by operation of the lever member 70, slides the double spool and this in turn moves the arm 80 of the second bell crank lever and the arm 85 whereby the valve is controlled. Thus the supply of insecticide, which flows upwardly through the hose 13 to the valve 58, see Fig. 4, may be shut off closely adjacent the nozzle. This is much to be desired, inasmuch as it gives instant stoppage of the spray and dribbling is eliminated.

From the above description it will be appreciated that I have invented a construction which is capable of being adjusted to many positions whereby the insecticide or spray may be applied under optimum conditions. That is, the spray may be directed toward the various branches and foliage so as to accomplish a maximum spraying effect with a minimum of liquid.

Furthermore, the flow of the fluid may be shut off at a point closely adjacent the nozzle whereby immediate termination of the spray may be had. Thus, waste is decidedly minimized.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

I claim:

1. In a spraying device of the class described, a supporting structure, a semi-circular segment, means for mounting the segment at each end upon the base so that movement of the semi-circular frame is had about those points, a rod located between the ends of said segment, a pole pivotally mounted upon said rod, means for pivoting the pole upon its mounting means, said pivot being located at the geometrical center of said segment, means cooperatively associated between the pole and the curved portion of the segment whereby the pole may be located in a number of different positions, a nozzle located at the top of said pole and means for supplying the same with fluid.

2. The combination with a spraying pole, a reservoir, and a nozzle pivotally mounted on one end of said spraying pole, of means on said pole to operate the nozzle valve comprising a double grooved spool slidably mounted adjacent said nozzle, a bell crank lever having one end in one of the grooves of said spool, a slidably mounted rod on said pole having one end pivotally secured to the other end of said bell crank lever, a second bell crank lever having one end in the other groove of said spool and the other end secured to the nozzle valve, whereby a sliding of said rod will effect a movement of said valve.

3. The combination of elements defined in claim 2, combined with means to rotate said pole and nozzle about either or both of two horizontal axes at right angles to each other and a vertical axis.

4. The combination with a spraying pole, a reservoir, and a nozzle pivotally mounted on one end of said pole, of means to rotate said pole and nozzle about either or both of two horizontal axes including a horizontal pivot rod, a journal member rotatably mounted on said rod, a universal joint construction on said journal member adapted to receive the lower end of said pole, a continuous frame member of substantially a semi-circular form pivotally secured adjacent the ends of said rod having a plurality of spaced apart notches therein, and means on said pole adapted to fit in said notches whereby said pole may be maintained in any position along said frame.

5. In combination, a spraying pole, a nozzle located at its upper end, a socket member receiving the base of the spraying pole whereby the same may rotate about its longitudinal axis, a journal member, means to slidably mount the journal member for movement about a horizontal axis, pivotal means connecting the said socket member and the said journal member whereby the spraying pole may be rotated about a second horizontal axis at right angles to said first named axis, spring means acting upon the spraying pole for normally urging it to a vertical position with respect to the second horizontal axis, means for supplying the nozzle with insecticide, a semi-circular segment located near the base of the pole, means for fastening the ends of this segment rigidly in position, the segment being located immediately adjacent the pole when the pole is in its upright position, and means cooperatively associated with the pole and the segment whereby the pole may be locked thereto in any one of a plurality of positions.

HENRY C. HACHMUTH.